United States Patent [19]

Bertoldo

[11] 4,392,899
[45] Jul. 12, 1983

[54] PROCESS AND APPARATUS FOR MANUFACTURING VEHICLE TIRES

[75] Inventor: Giorgio Bertoldo, Arese, Italy

[73] Assignee: Societa Pneumatici Pirelli S.p.A., Milan, Italy

[21] Appl. No.: 311,601

[22] Filed: Oct. 15, 1981

[30] Foreign Application Priority Data

Oct. 15, 1980 [IT] Italy .................. 25340 A/80

[51] Int. Cl.³ .................................. B29H 17/20
[52] U.S. Cl. ............................ 156/127; 156/417
[58] Field of Search .......... 156/126, 127, 414, 416, 156/417

[56] References Cited

U.S. PATENT DOCUMENTS

| 3,676,672 | 7/1972 | Leblond | 156/417 |
| 4,288,265 | 9/1981 | Pacciarini et al. | 156/126 |

FOREIGN PATENT DOCUMENTS

| 4202 | 9/1979 | European Pat. Off. |
| 2314821 | 1/1977 | France . |
| 907692 | 10/1962 | United Kingdom . |
| 1181073 | 2/1970 | United Kingdom . |
| 1238201 | 7/1971 | United Kingdom . |
| 1307816 | 2/1973 | United Kingdom . |
| 1407115 | 9/1975 | United Kingdom . |
| 1414019 | 11/1975 | United Kingdom . |
| 1417611 | 12/1975 | United Kingdom . |
| 1509606 | 5/1978 | United Kingdom . |

Primary Examiner—Michael W. Ball
Attorney, Agent, or Firm—Stevens, Davis, Miller & Mosher

[57] ABSTRACT

This invention provides a method and apparatus for making vehicle tires wherein the annular, reinforcing structure and the tread band are manufactured on two drums, one drum having a comb-shaped surface, and the other drum having sectors.

The comb-shaped drum is co-axial and can be slipped off with respect to the drum having sectors. Means are provided for rotating the two drums independently of one another in a slipped position, and for centering the teeth of the comb when the two drums are one around the other. After centering, the sectors are expanded, from the inside towards the outside of the comb, for sustaining the annular structure previously disposed on the comb in a slipped position from the sectors and for receiving the tread band.

10 Claims, 7 Drawing Figures

PROCESS AND APPARATUS FOR MANUFACTURING VEHICLE TIRES

This invention relates to an improved process and apparatus for manufacturing vehicle tires, and more particularly, to a process for making tires having a radial carcass, an annular reinforcing structure and a tread band.

Still more particularly, the invention relates to a process and apparatus for combining apart from the carcass, an annular reinforcing structure and a tread band, and for assembling the combination with the carcass for toric shaping of the tire.

As disclosed in application Ser. No. 76,743 filed on Sept. 18, 1979, now U.S. Pat. No. 4,288,265, of which I am a joint inventor there is already known a process which comprises the steps of winding at least two elastomeric layers reinforced with crossed metallic cords around the cylindrical surface of a hollow comb-shaped drum, having sectors disposed therein, and expanding the sectors between the comb teeth until the two reinforcing layers are supported, sliding the comb-shaped drum off the sectors, winding other reinforcing layers and the tread band on the two reinforcing layers having metallic cords already expanded, taking the complex annular reinforcing structure and tread band around the carcass while it has a cylindrical form or is partially shaped on the main expandable drum, and finally, torically shaping the carcass against the complex annular structure and band, and then vulcanizing the assembly. In the disclosed process, the sectors and comb are fixed with the shaft without any possibility of relative angular slipping for the purpose of always maintaining the alignment of the sectors with the spaces between the teeth of the comb, even when the latter slides along the shaft at the side of the sectors. This characteristic makes it possible to return the comb around the sectors and then correctly expand the sectors, from the inside to the outside, of the comb.

It has now been found that although the process and apparatus of the earlier application provide improved and more uniform distribution of the metallic cords, the production rate can be increased by improving the process and the apparatus, and at the same time provide a product of improved quality.

The problem is rather complex, because the manufacturing time of the tire on the main expandable drum, is quite short and is sensibly shorter than the time required for manufacturing the annular reinforcing structure and the tread band separately.

For example, in making tires having an annular structure that comprises two layers of metallic cords crossed with one another and one layer of nylon cords at 0°, only about 50% of the total time of manufacturing the tires is required on the main drum.

Therefore, the expandable drum remains inactive for a greater part of the time while the comb-shaped drum is active.

The problem of improving the production rate, could be solved by employing two comb-shaped drums having relatively expandable sectors between the teeth of the comb, but, as is apparent, there would be an economic disadvantage, due to the consequent doubling of costs of the plant, and a further drawback in the overall dimensions of the apparatus required for assembly of the various reinforcing strips of metal cords, strips having textile cords, the tread, and thereafter transporting the elements to the drum where the carcass is disposed.

It is therefore an object of the present invention to improve the process and apparatus for the manufacture of radial tires, which is devoid of the foregoing disadvantages. Another object of the invention is to provide an improved process and apparatus for making a vehicle tire having an annular reinforcing structure and a tread band on a radial carcass. Still another object of the invention is to provide an improved process and apparatus for making a vehicle tire where an annular reinforcing structure and tread band are manufactured on a comb shaped drum and a second drum having sectors. A still further object of the invention is to provide a process for making a radial carcass, a tire band and an annular belt for reinforcing the tread band, and assembling the tread band and reinforcing structure with the carcass in a shorter production time than required by prior art processes.

Other objects will become apparent from the following description with reference to the accompanying drawing wherein.

The foregoing objects and others are accomplished in accordance with this invention, generally speaking, by providing a process for making a vehicle tire having a carcass, a tread band, and an annular reinforcing structure for the tread band disposed between the carcass and tread band, the process comprising the steps of (a) preparing a carcass for a first tire in a cylindrical form on a first expandable drum;

(b) applying an annular reinforcing structure of a first tire on a hollow drum having a comb-shaped surface;

(c) expanding the sectors of a second expandable drum between the void spaces of the comb from an inner position to an outer position of the comb while maintaining the annular reinforcing structure only with the sectors;

(d) slipping the comb-shaped drum from the drum with sectors;

(e) placing a tread band on the annular structure that is supported by the sectors of the second drum;

(f) transferring the annular reinforcing structure and the tread-band from the second to the first expandable drum;

(g) expanding the first expandable drum for toroidally shaping the tire;

(h) removing said tire from said first expandable drum; the process being characterized by the fact of comprising the additional steps of:

(i) applying the annular reinforcing structure of a second tire on the comb-shaped drum in a slipped position from the sectors after phase (d);

(j) preparing a carcass of a second tire in a cylindrical form on said first expandable drum after completion of step (h)

(k) transferring, after step (f), the annular reinforcing structure of the second tire, supported by the comb-shaped drum around the sectors of the second drum;

(l) repeating the steps from (c) to (h), after step (k).

The winding of the two reinforcing layers onto the comb in a slipped position with respect to the sectors, increases productivity over that of heretofore known processes. In fact, in the present process, as soon as the comb, on which are wound the two layers, is taken around the sectors that are already freed of the previous annular structure, there is immediately initiated the expansion of the same sectors between the teeth of the comb, instead of maintaining the comb idle in a slipped position as in prior art processes, when the comb being linked with the rotation speed of the expanded sectors on which other textile reinforcing layers and/or the tread band were applied, it could not rotate under its own velocity for winding the two reinforcing layers of the additional reinforcing structure of a second tire.

The invention also provides an apparatus for manufacturing tires having a carcass, an annular reinforcing structure with at least two layers of reinforcing cords, and a tread-band. The apparatus has a hollow drum with a comb-shaped cylindrical surface for the application thereon of two reinforcing layers of the annular structure with cords crossed together and a second drum, with sectors that are expandable between the void spaces of the comb-shaped drum, from inside towards the outside of the comb, for supporting the reinforcing layers and the tread-band; the comb-shaped drum being slidably disposed on the drum having sectors, the apparatus being characterized by the fact of comprising means for causing the comb-shaped drum and the drum with sectors to rotate with respect to each other in a slidable position independently of one another, in both sense and speed, in combination with centering means for aligning the sectors of the second drum with the overlying void spaces between the teeth of the comb, when the two drums are disposed with one around the other.

The apparatus provided by the invention is based upon the concept of rotating the comb and the group of sectors 13 mutually independently; in practice in the concept of transforming the known drum described in the aforesaid earlier application into two active drums when they are in the relative slipped position, while providing centering means for once again bringing the sectors back to the aligned position with the void spaced between the comb teeth, when the two drums are associated one with the other, for also allowing during the expansion step, the passage of the sectors between the teeth of the comb.

One of the advantages, resulting from the just described characteristics, is that of distributing, in two working stages instead of in one, multiple feeding of the different component parts of the annular reinforcing structure and the tread.

Generally speaking, adequate space is provided for directing the various parts of the tire tangentially to the drums and hence, without changes in direction. All this, in such a way, as to gurantee the absence of unacceptable deformations in the various strips.

It is understood therefore, how it is possible to feed even complex and differentiated annular structures comprising additional layers besides the basic two layers with their crossed metallic cords in such a way as to provent deformations of the various strips, or thinning of the cords, in particular, also owing to the fact that the independence in the senses of rotation of the comb and of the sectors when they are slipped, one relatively to the other, enable setting of the feeders instead of upon only one side with respect to the two drums, for example, on one side of one drum, and on the opposite side of the other drum.

Figure 1:
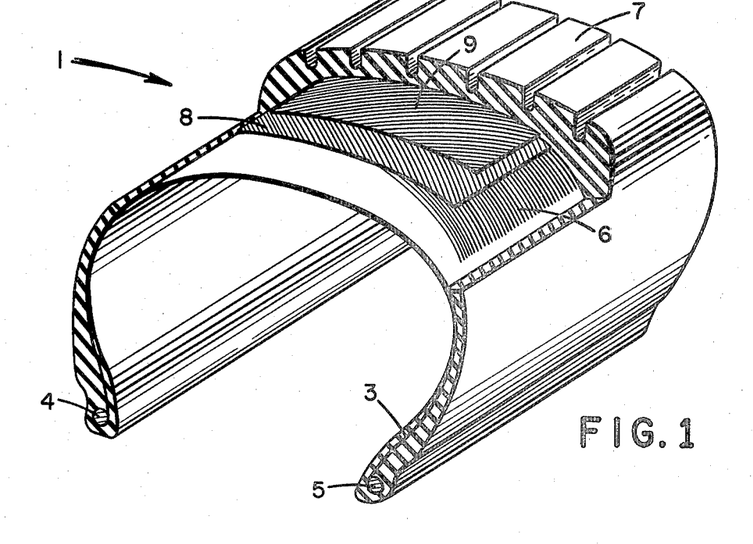
FIG. 1 is a perspective view of a part of one embodiment of a vehicle tire having a radial carcass provided by the invention.
Figure 2:
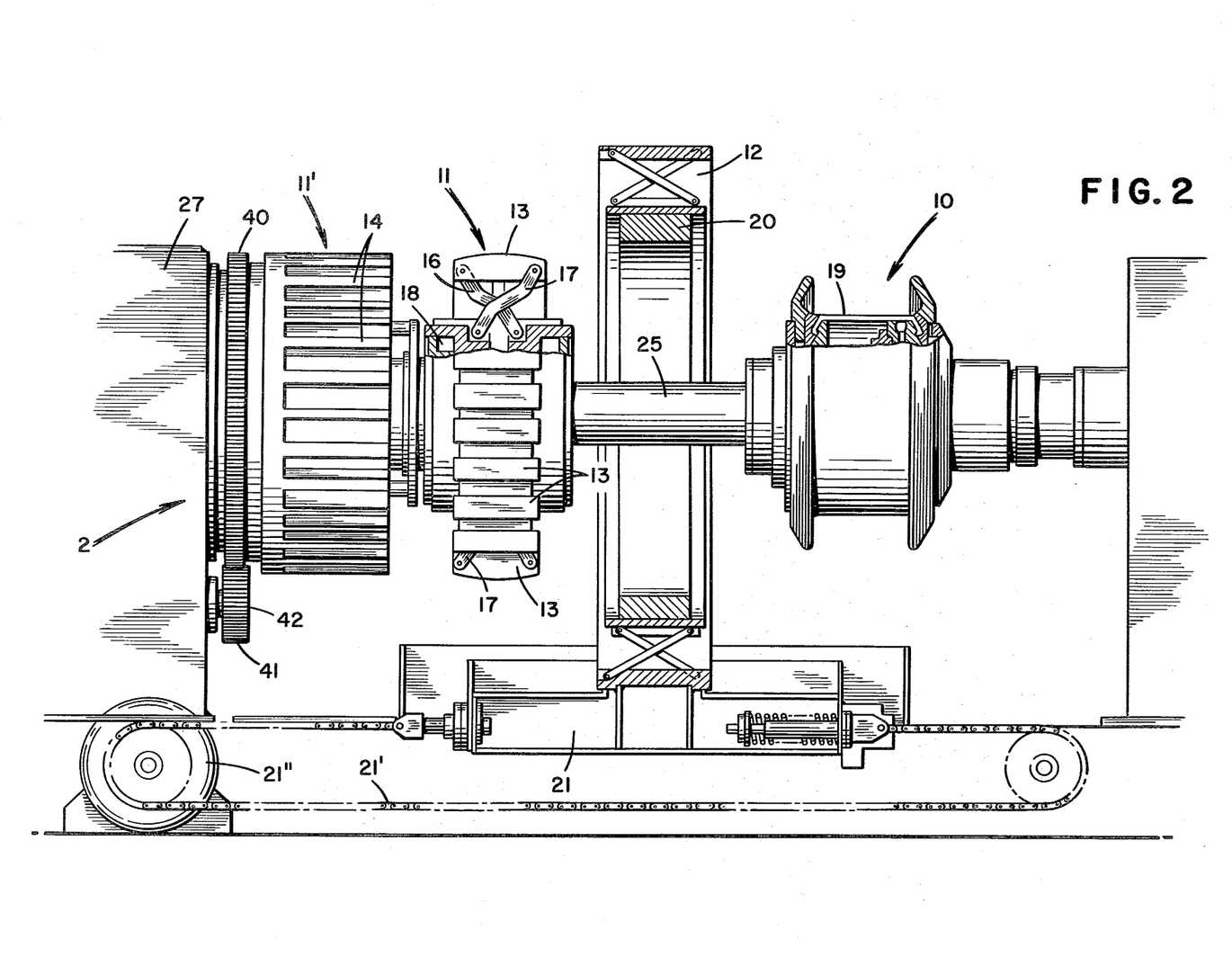
FIG. 2 is a diagrammatic elevation of one embodiment of the apparatus provided by the invention.

Referring now to the drawing, in the following description, there is first illustrated in FIG. 1 one of the many radial tires 1, for which the invention is particularly applicable, and a relative manufacturing plant is illustrated in FIG. 2.

The tire illustrated after the manufacturing process has been finished comprises a single-ply radial carcass 3 having its ends turned-up around the bead wires 4,5, annular reinforcing structure 6, and a tread 7.

The annular reinforcing structure 6 comprises an annular belt having two layers 8,9, comprising metallic cords, crossed one with the other, and inclined with respect to the equatorial plane of the tire at an angle of 5° to 35°, for example, 20°.

Obviously in another embodiment, the reinforcing structure can comprise other reinforcing layers, for example, nylon cords having a longitudinal direction parallel to the equatorial plane of the tire (omitted here without causing any harm to the understanding of the invention).

Generally speaking, the plant 2 for manufacturing the tire 1 comprises a basic drum 10 for building the carcass 3 first in a cylindrical shape, and thereafter, in a first toric shape, an apparatus formed by an expandible drum 11 and by a second hollow drum 11' with a cylindrical surface of a fixed diameter, for shaping the belt first in a cylindrical form with a diameter corresponding to the maximum diameter of the carcass of the first shape, and then for shaping the belt into a shape corresponding to a central portion of a toric surface, means 12 for transporting the annular complex constituted by the belt and by the tread from the apparatus to the basic drum 10 with the midplane of the annular pack corresponding to the mid-plane of the carcass of the first shaping, in such a way as to be able to proceed successively with a second toric conformation of the carcass until the crown zone reaches and is disposed against the corresponding inner surface of the belt.

The basic drum 10, the two drums 11,11' and the means 12, are equal and correspond, also in the figures of the present text except for those parts expressly explained, with those described in U.S. patent application Ser. No. 76,743 filed Sept. 18, 1979, assigned of the present application, the disclosure of which is incorporated herein by reference.

Hence, it is repeated here, briefly and simply, that drum 11 is formed of metallic sectors 13, preferably steel. The drum 11' has the form of a comb-with-teeth 14 and magnets between which pass the portions of the convexed surfaces of the sectors separated by grooves 15 (see FIG. 7) inside which the teeth of the comb are lodged when the sectors (through the crossed levers 16,17) are shifted radially by a fluid-dynamic control 18.

The basic drum 10 comprises a bladder 19, and the means 12 comprise a ring with sectors 20 that are radially shiftable in two senses, and a relative controller of movement with a slide 21 moved by a chain 21' pulled by a motor 21".

Between the drum 10 and the drums 11 and 11', there exist certain geometrical relationships, in the sense that each one of these drums contributes towards determining maximum diameters of the carcass, of the annular reinforcing structure, and of the tire, during the steps of the process that will be illustrated later on. These diameters and the final diameter, after vulcanizing the tire in the mold, are obtained by means of a first and a second toric shaping of the carcass, which is followed by a final expansion in the mold and the relative values are, for example, those cited in the U.K. Pat. No. 1,509,606 assigned to the assignee of this application.

The characteristic parts of the apparatus of the invention will now be described. The apparatus comprises means for independent rotation in the direction and velocity of the comb-shaped drum 11' slipped from the second expandable drum 11, and the centering means for aligning the sectors 13 of the second expandable drum with the overlying void spaces between the teeth 14 of the comb.

Figure 3:
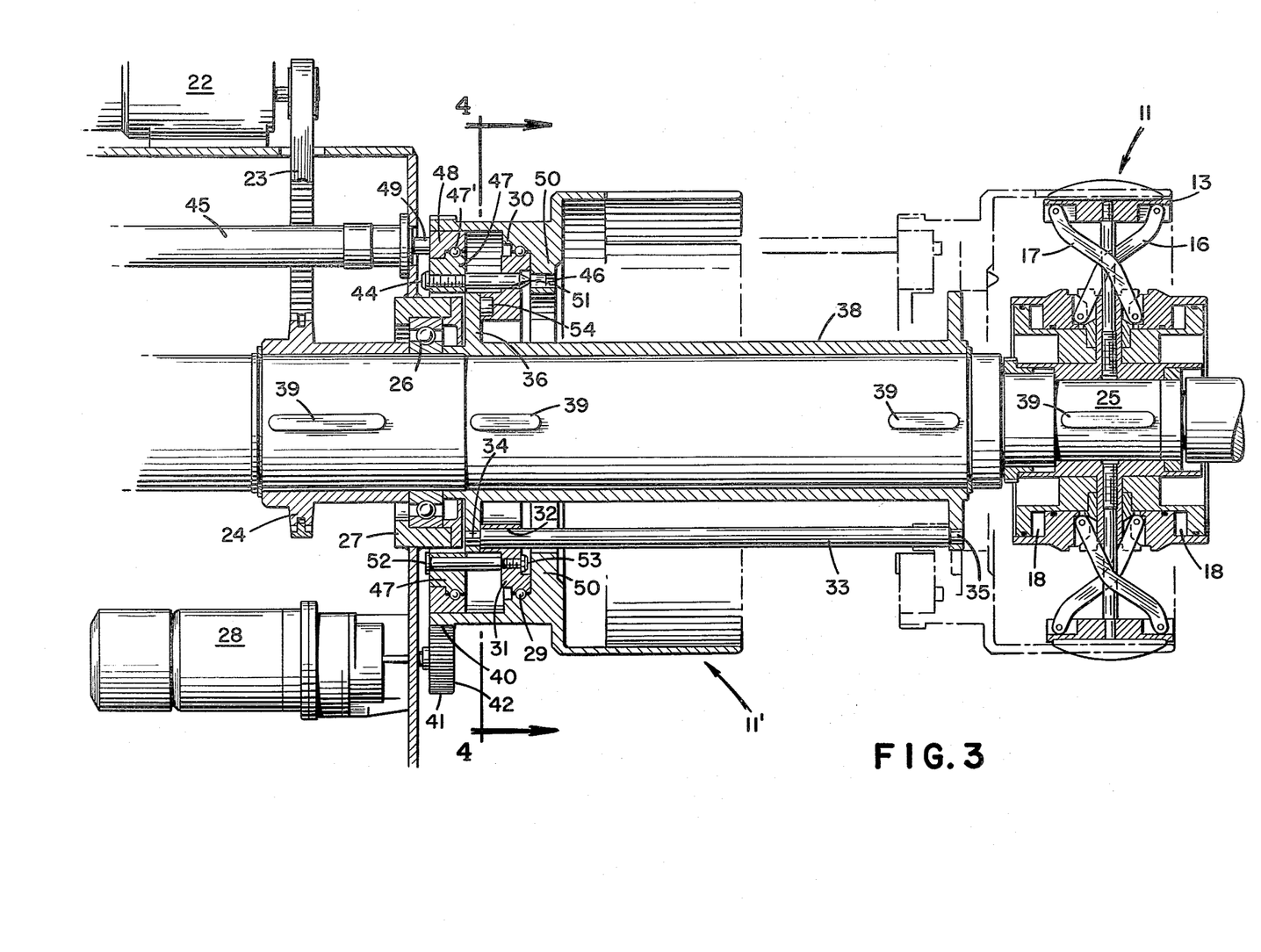
FIG. 3 is a partial cross-section of the apparatus illustrated in FIG. 2.

The means for independent rotation, comprise two distinct motors, the first one 22, linked (FIG. 7) by means of belt 23 to a toothed wheel 24 fixed to a main shaft 25 (FIG. 3) mounted in cantilever fashion and on bearings 26 in a frame 27 for supporting at one end, the sectored drum 11, the second motor 28 connected with the comb-shaped drum idly mounted by means of bearings 29, on parts forced to rotate with the main rotating shaft 25. As can be seen in FIG. 3, the comb-shaped drum is in a position stripped from the sectors 13 and is connected in between the drum-with-sectors and the frame, at such a distance as to guarantee the absence of any mechanical interference between the edge of the tread-band on drum 11, and the end of comb 11'.

In a preferred embodiment, the comb-shaped drum is provided laterally from the part opposite to the sectored drum in FIG. 3, with a shape which has substantially the form of a sleeve 30 idly mounted on parts that are fixed to shaft 25, in the form of slidable slab 31, through holes 32 on guide-rod 33 the ends 34,35 of which are fixed upon two slabs 36,37, coaxial to the shaft 25. In their turn, the slabs 36,37, constitute end flanges of a cylinder 38 fixed on the shaft 25 through a key 39.

The sleeve 30 and hence, the comb 11' can rotate in either of two senses and at the desired velocity, independently of the shaft 25, and hence of the drum-with-sectors 11, through the motor 28, to which it is compactly connected by means of a special toothing engaging with the corresponding toothing 41 of the pulley 42.

The invention contemplates in combination with means for the independent rotation of drums 11 and 11', means for centering the sectors relatively to the comb. These centering means are to allow the expansion of the sectors between the teeth of the comb when the drum 11' is completely around the sectors in a contracted position.

The means for the independent rotation of the two drums 11,11', and the centering means, constitute the fundamental part of the invention and differentiate it, in its concept, with respect to the known process of the Assignee; in fact, in the present case, thanks to the independent rotation, the two reinforcing layers 8,9, (FIG. 1) are disposed on the comb 11', and then (as shall be explained further on in the text), the teeth 14, and finally, the sectors 13 are expanded to sustain alone the two reinforcing layers, while the comb can be once again slipped-off in preparation for receiving a new load of reinforcing layers for a second tire.

In the known process, in the position of comb 11' slipped off sectors 13, the step of loading the reinforcing layers 8,9, on the comb was lacking since drum 11', in order not to lose the alignment relative to the sectors, was caused to rotate with them on the shaft, when the sectors receive the applied tread-band.

Hence, the present method offers a substantial improvement over the previous one because, by rendering active the step during which the comb is slipped-off, the productivity of the plant is increased.

In a preferred embodiment the centering means are provided in such a way as to intervene before the comb is introduced around the drum-with-sectors, and still in particular, they are activated in the position of maximum sliding between the drums 11 and 11'.

These centering means are based on the concept of having a centering element on a drum with the drum position predetermined in such a way as to constitute a fixed point of reference, as desired, corresponding, for example, to a sector and a plurality of seats on the other drum, all adapted to receive this element and to correspond in the example, to void spaces between the comb teeth.

Figure 4:
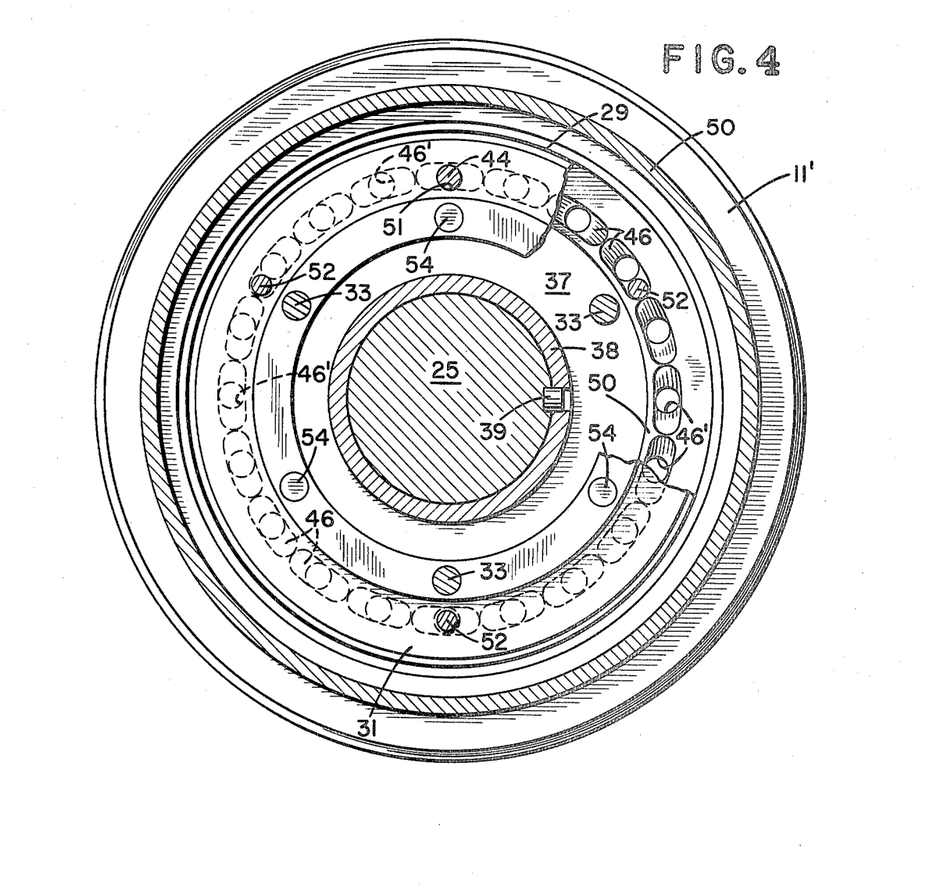
FIG. 4 is a fragmentary end view of the embodiment illustrated in FIG. 3.

This concept provides a centering element having the shape of a pin 44 that is shiftable by fluid-dynamic control 45, in a way parallel to the main shaft 25 towards one of the housing seats 46 that are opportunely flared-out towards a circular hole 46' (FIG. 4).

The fluid-dynamic control 45 in the embodiment of the example, is associated with the frame 27, the pin 44 is supported by a flange 47 co-axial to the main shaft 25 and idly mounted by means of bearings 47' inside a circular guide-ring 48, co-axial to the shaft and supported by the piston 49 of the fluid-dynamic control 45.

The flange 47 with the pin, is placed opposite to a disc 50 that is applied and laterally connected to the comb sleeve, and on this disc housing seats 46 are disposed. Seats 46 are flared to favor insertion of the pin and are of a number corresponding with the number of void spaces between the teeth of the comb.

Preferably, between flange 47 and the disc 50, slab 31 is slidably disposed on guide-rod 33; slab 31 (FIG. 3) comprises a hole 51 inside which can slide the pin 44, connecting to the flange 47 and the slide-bars 52, passing through the specially made holes in the flange 47.

It is evident from what has been described, how the fluid-dynamic command 45 acts by shifting twice, the first shift relative to the approaching of the guide-ring and the flange towards the slab 31, until insertion of the pin into one of the seats 46 and the second shift being carried out through a further stretching of the piston 49, relative to insertion in the comb-shaped drum all around the sectors.

Hence, at the end of the first shifting of the piston 49, there is established alignment between the teeth of the comb and the sectors, whereby the pin 44 and one of the seats 46 are fixed with each other, without any possibility of angular movements, respective to the sectors 13 and to the comb 11', and at the start it is so chosen, for example, that the seats 46 correspond to the void spaces between the comb-teeth and pin 44, when it is inserted into one of the seats 46, is in a position to permit passage of the portions of the sectors 13 in between the grooves 15, from the inside towards the outside of the comb, through the spaces between the teeth 14.

The functioning of the plant will now be explained herebelow: At the initiation of the process, a cylindrically shaped carcass is disposed beforehand upon a basic drum 10, and the carcass is shaped into a first toric configuration, by drawing the two carcass beads closer together and by introducing compressed air into bladder 19 until the diameter of the carcass corresponds substantially to the cylindrical surface of the comb-shaped drum 11', or is slightly smaller.

Independently of the cited steps, the comb-shaped drum 11' is rotated when slipped from the sectors 13, and thus, the two reinforcing layers 8 and 9, are wound. Hence, the joining of the two opposite extremities is carried out, and the layers are rolled over, to prevent any air becoming trapped inside.

Successively, the fluid-dynamic command 45 is activated distending the piston 49 and extending through the bearing 47', shifting also the flange 47 and the relative pivot 44. During the advancing of the piston, the flange 47 is guided on bars 52, gradually drawing closer to the slab 31 and, at the same time, the pin 44, moves into a hole 51 and comes into a frontal position in contact with the disc 50, it penetrates one of the seats 46 of the comb-shaped drum, or, in this instance, is eventually aided by small angular rotations of the comb-shaped drum.

For the purpose of preventing any mechanical interferences, during the course of the piston 49, the gears 40 and 41, between the motor 28 and the sleeves 30, are spaced apart through the action of a special fluid-dynamic control (not shown) that lowers the supporting slab of the motor 28.

Moreover, one or more magnets 54 are disposed on the periphery of the slab 31 for maintaining it in contact opposite slab 36, in order to avoid pin 44 pulling slab 31, and sleeve 30, and thereby drawing away the disc with the seats 46.

At the time pin 44 is inserted in one of the seats 46, the alignment of the sectors 13 with the void spaces between the teeth 14 of the comb is determined.

Figures 5, 6, 7:
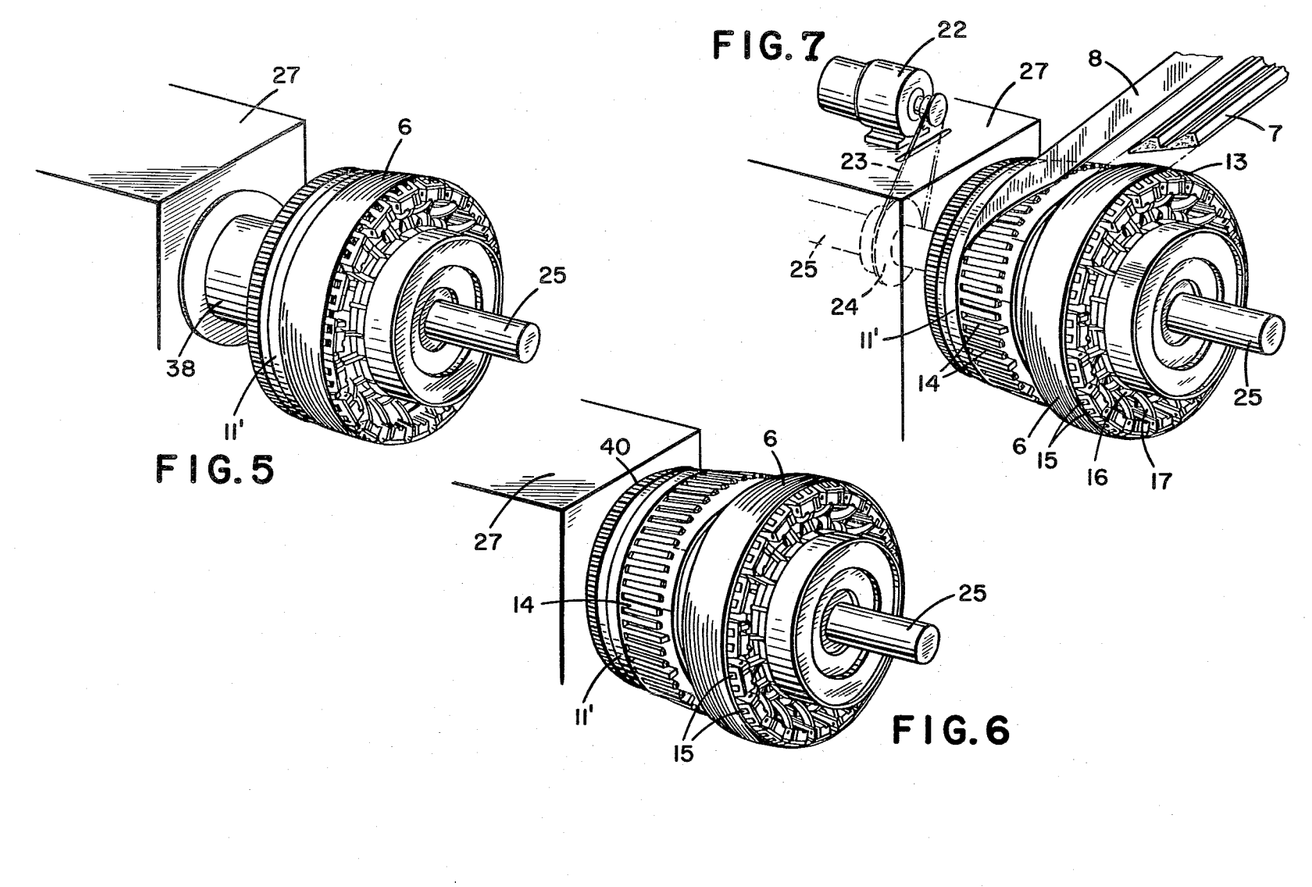
FIG. 5 is a perspective view showing the apparatus in one step of the process with the annular reinforcing structure disposed around the sectors.
FIG. 6 is a perspective view of the apparatus in the step of the process where the comb is slipped off the sectors, in an expanded position.
FIG. 7 is a perspective view of the apparatus in the step of the process in which an annular reinforcing structure of a second tire is disposed on the comb of one drum while the expanded sectors are about to receive the tread band of the first tire.

At this point, control 45, whose piston 49, advances slab 31, can be activated by detaching magnet 54 from slab 36 with the comb shifting into the broken-line position of FIG. 3, around the sectors 13 which are, in their turn, in a contracted position as shown in FIG. 5.

In a succeeding step, the fluid-dynamic control 18 (FIG. 2) is activated to move sectors 13, to a position radially outside of the teeth 14 of the comb, until the sectors support by themselves the annular reinforcing structure 6, i.e. until the structure 6 is converted from cylindrical into a central portion having a toroidal surface with the outermost diameter of the mid-plane corresponding to that of the maximum toroidal configuration for the carcass measured according to the equatorial plane.

In a further step, the comb 11' is again removed from sectors 13, until it is returned to the position illustrated in FIG. 6, and after having joined the sleeve 30 to the motor 28, the two drums 11 and 11' are simultaneously fed and rotated (see FIG. 7).

More specifically, the drum, with sectors 11, if other reinforcing layers are not present or eventually, for example, after having wound a strip of longitudinal nylon cords, is rotated for winding the tread band 7 onto the annular structure 6. The comb-shaped drum 11' is rotated in the same or the opposite sense to the drum 11 according to the position of the feeder for winding two additional reinforcing layers 8 and 9 of a second tire.

Successively again, in a way similar to the operations described in the above said U.S. application, ring 12 is disposed around the assembly of the tread band 7 and the structure 6 on the drum 11, with contraction of the sectors 13, drawing of the assembly, and transferring of the assembly onto the basic drum 10 around the carcass having a first toric shaping; hence, to the succeeding further toric shaping of the carcass against the innermost layer of the annular reinforcing layer and finally, to various rolling operations on the tread, and withdrawing the tire for vulcanizing it in a mold, where additional equatorial elongation of the tire occurs.

Within the same time in which the transferring of the complex structure 6 and the band 7 are initiated, and, simultaneously, to the end of the operations on the basic drum 10, the already described centering operations are repeated between the comb 11' and the sectors 13 which are now without their first annular structure and treadband, and hence, in a contracted position, these sectors are expanded and finally the second band is applied. Everything is done in such a way that the second assembly is already predisposed for withdrawing and transferring onto the basic drum 10 where there is already disposed the carcass of the second tire.

The contemporaneous manufacture of a second assembly on the drums 11 and 11', when the first assembly is being withdrawn from the drum 11 and then is on the drum 10, makes it possible to increase production over that of the heretofore available processes.

In fact, in the present case, the preparation and winding of the two additional reinforcing layers with cords, for a second tire, is developed on the drum 11' when a tread band is disposed on the drum 11 for the first tire, and during the drawing operations of the first assembly of tread-band and annular structure; at least theoretically, the process of the invention doubles the production of the annular structure and tread-band assembly over the old method, and since the operations on basic drum 10 are carried out in less time than that needed for manufacturing the whole assembly, the present process about doubles the production of the older process.

This improvement is obtained without sacrificing the quality of the finished product.

In fact, during the various steps of the process, the annular reinforcing structure is protected from mechanical deformation since the invention is based upon the concept of disposing reinforcing layers with crossed metallic cords, on a fixed cylindrical surface (the comb) and then of transferring to other working phases the layers through an expansion by the sectors that pass through the comb teeth, hence, the metallic cords, crossed with each other, become settled and are uniformly distributed. The process does not involve any mechanical drawback such as would occur, for example, if reinforcing layers 8, 9 were transferred to a second expandable drum 11 by contracting the parts of the cylindrical supporting surface around the sectors of the second drum, or around an expandable membrane. It is clear in fact, that such contraction could generate partial flexion with a consequent mechanical deformation of some zone of the reinforcing layers by the adherence of the rubber in which the cords are embedded in order to follow the contractions of the teeth on which they were originally placed in a cylindrical form.

In the present process, it is only in the last step before transferring the annular structure and tread band assembly from the drum 11 to the drum 10, that sectors 13 are contracted, but in this case, the thickness of the tread-drum determines a total thickness for the assembly which prevents the zones of the layers with metallic cords from following sectors 13 in their contractions, and hence, prevents them for deforming.

The invention has been described with regard to a process and an apparatus comprising a drum 11 with convexed sectors, i.e. a drum having a transverse curvature. However, the invention is equally applicable to an expandable drum 11, with its sectors 13 which do not curve transversely, i.e. that has a total periphery which is cylindrical in form, when in an expanded position.

In this case, the expansion of the sectors 13 is such that the outermost reinforcing layer 9 is increased in diameter between 3% and 4% of the diameter corresponding to the cylindrical shape.

It is also apparent, that regardless of whether thhe sectors are convex or without transverse curvature, this invention can be practiced for shaping the carcass with two distinct and successive toroidal configurations, or by effecting a single toroidal configuration of the carcass against the relative annular complex structure and tread-band.

The process and apparatus of the invention can be practiced with a basic drum 10 without a bladder; or the basic drum 10 can be aligned with the axis of rotation of the drums 11 and 11' for the purpose of simplifying the movement of the parts (FIG. 2) or in an other way for example with shaft 25 mounted in cantilever fashion on frame 27 and drum 10 mounted on a different shaft.

Using the hypothesis of the cited alignment between the three drums, drum 10 can be disposed to idle on the shaft of drum 11'. Also the carcass, in cylindrical form can be prepared apart from drum 10 or directly built on drum 10.

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. In a process for manufacturing tires which comprise a carcass, an annular reinforcing structure, and a tread-band which process comprises the steps of:
   (a) preparing a carcass of a first tire in a cylindrical form on a first expandable drum;
   (a) building an annular reinforcing structure for the first tire on a hollow drum having a comb-shaped surface;
   (c) expanding the sectors of a second expandable drum, between void spaces of the comb, from an inner position to an outer position of the comb, thereby shaping and supporting the annular reinforcing structure only with the sectors;
   (d) slipping the comb-shaped drum from the drum-with-sectors;
   (e) applying a tread-band on the annular structure while it is supported by the sectors of the second drum;
   (f) transferring the annular reinforcing structure and the tread-band from the second to the first expandable drum;
   (g) expanding the first expandable drum to impart a final toroidal shape to the tire; and
   (h) removing said tire from said first expandable drum;
   the improvement which comprises the additional steps of
   (i) building the annular reinforcing structure of a second tire on the comb-shaped drum in a slipped position from the sectors after step (d);
   preparing a carcass of a second tire in a cylindrical form on said first expandable drum after completion of step (h);
   (j) transferring, after step (f), the annular reinforcing structure of the second tire while supported by the comb-shaped drum around the sectors of the second drum; and
   (k) repeating steps (c) to (h).

2. The process of claim 1 wherein the steps of applying, the said assembly, of disposing the assembly around the carcass and of shaping the tire into a toroidal configuration are effected by maintaining the axes of the three drums coincident.

3. In an apparatus for making a vehicle tire having a carcass, a tread band, and an annular reinforcing structure disposed between the carcass and the tread band, said apparatus comprising a building drum, axially separable into two distinct parts and recomposable into an assembled unity, for manufacturing and shaping said annular reinforcing structure and for assembling it with said tread band, said two distinct parts being respectively constituted by a first cylindrical, hollow, comb-shaped drum (11'), for manufacturing said annular structure, and by a second expandable drum (11) with sectors (13), for shaping the annular structure and for supporting said shaped annular structure during its assembling with the tread band, said comb-shaped drum having its teeth (14) off-set with the sectors of the expandable drum when said building drum is in the state of assembled unity, the sectors of said second drum being radially expandable through the void spaces in between the teeth of the comb-shaped drum from inside towards the outside of said comb, said apparatus also comprising means to axially slide said comb-shaped drum from and towards said expandable drum, bringing said two drums alternatively axially separated, in a position of no mutual interference, and joined together in assembled unity,
   the improvement wherein means are provided for allowing and for causing the comb-shaped drum to rotate independently in direction and speed with respect to the expandable drum, and centering means for aligning the teeth of said comb-shaped drum in off-set relationship with the sectors of the expandable drum, all said means acting when said drums are axially separated from each other.

4. Apparatus of claim 3, wherein said means for allowing an independent rotation of the comb-shaped drum, comprise two coaxial slabs (31,47), axially reciprocally slidable one from and towards the other, means being provided to cause said axial reciprocal sliding of the two slabs between two positions of maximum and minimum distance respectively, both said slabs being axially slidable in respect of the expandable drum and coaxial and fast-rotating with it, the comb-shaped drum being idly and coaxially mounted on the first slab (31) facing the expandable drum, the second slab (47) facing the first one, being idly and coaxially mounted on a guide-ring (48) made fast with means (45,49) adapted to control and to operate the axial sliding of said slab, and hence, of the comb-shaped drum with respect to the expandable drum from the position of reciprocal maximum sliding to that of assembled unity and vice-versa, centering means being provided, adapted to make the comb-shaped drum fast-rotating with its mounting slab and centered in said pre-fixed angular position of off-set relationship with the expandable drum, when the two slabs are at their minimum distance, and freely rotating when the two slabs are at their maxumum distance, respectively.

5. Apparatus of claim 4, wherein said centering means comprise at least one centering element fast with said second slab and a plurality of corresponding housing-seats provided on said comb-shaped drum, for receiving said centering element so as to lock the comb-shaped drum in a pre-fixed angular position with respect to said second slab, which in its turn is fast-rotating with the expandable drum.

6. Apparatus of claim 5, wherein said centering element is a pin (44) mounted on said second slab (47) with its axis parallel to the axis of said comb-shaped drum, slidable through a hole (51) provided on said first slab (31) towards one of said corresponding housing-seats on the comb-shaped drum, said housing-seats being circular holes (46) flared-out on the side facing said first slab, said holes being as many in number as the angular pre-fixed positions of the off-set relationship between the teeth of the comb and the void spaces in between the sectors of the expandable drum, circumferentially and coaxially distributed on said comb-shaped drum, all said flared-out portions being in contact with each other.

7. Apparatus of claim 4, wherein said means to cause the axial reciprocal sliding to the two slabs are binding means adapted to stop the axial sliding of the first slab until said maxiumum or minumum distance from the second slab, respectively, is reached.

8. Apparatus of claim 7, wherein said binding means comprise at least one magnet (54) provided on said first slab (31) on the side opposite to the comb-shaped drum and facing a flange (36) fast with the rotating shaft of the expandable drum, said magnet being able to maintain the contact between said flange and said slab, so that the sliding movement of said slab with respect ot the expandable drum is prevented during the going-in and the going-out of the pin into and from the corresponding housing-seat.

9. Apparatus of claim 4, wherein said means for causing the independent rotation of said comb-shaped drum, comprise a motor (28) mounted on the frame (27) of the apparatus, means adapted to join together said motor and said drum only when said drum is in the position of maximum sliding from said expandable drum and freely rotating on its supporting slab.

10. Apparatus of claim 4, wherein said first slab is made fast-rotating with the expandable drum by means of a guide-rod (33) mounted on the rotating-shaft (25) of the expandable drum, with its axis parallel to that of said shaft and with its ends (34,35) fixed upon two flanges (36,37) radially extending from said shaft, coaxial and fast with it, said first slab being axially slidable in both senses along said guide-rod passing through a hole (32) provided on the first slab itself and the second slab is made fast-rotating with the first slab by means of a slide-bar (52) fixed on the first slab with its axis parallel to that of said rotating-shaft, said second slab being axially slidable in both senses, along said slide-bar, passing through a hole provided on the second slab itself.

* * * * *